United States Patent [19]

Truskalo

[11] 4,429,260
[45] Jan. 31, 1984

[54] TELEVISION RECEIVER POWER SUPPLY FERRORESONANT LOAD CIRCUIT PROVIDED WITH A REDUNDANT OPERATING CAPABILITY

[75] Inventor: Walter Truskalo, Titusville, N.J.

[73] Assignee: RCA Corporation, New York, N.Y.

[21] Appl. No.: 309,642

[22] Filed: Oct. 8, 1981

[51] Int. Cl.³ .............................................. H01J 29/70
[52] U.S. Cl. ..................... 315/411; 315/400; 358/190; 358/243; 323/310; 323/306; 363/75
[58] Field of Search .............. 315/411, 400; 358/190, 358/243; 323/310, 306; 363/75

[56] References Cited

U.S. PATENT DOCUMENTS 4,240,013 12/1980 Wedam .............................. 315/411
4,353,014 10/1982 Willis ................................. 315/411

Primary Examiner—Theodore M. Blum
Attorney, Agent, or Firm—E. M. Whitacre; P. J. Rasmussen; Joseph Laks

[57] ABSTRACT

A self-regulating power supply for a television receiver includes a transformer with a primary winding coupled to a source of input voltage for developing an alternating polarity supply voltage across a secondary winding. The supply voltage is stepped up, rectified and filtered to develop an ultor accelerating potential for the picture tube of the television receiver. A ferroresonant or self-regulating load circuit includes a saturable reactor having a winding coupled to the transformer secondary winding to provide regulation of the supply voltage, and thus, regulation of the ultor accelerating potential. The transformer secondary winding and the saturable reactor winding each comprises two winding sections, with each section having a terminal coupled to a common reference point, such as chassis ground. This type of arrangement provides redundancy in the ferroresonant operation of the self-regulating load circuit to avoid excessive increase in supply voltage should a portion of the self-regulating load circuit become disconnected from the transformer secondary winding.

12 Claims, 4 Drawing Figures

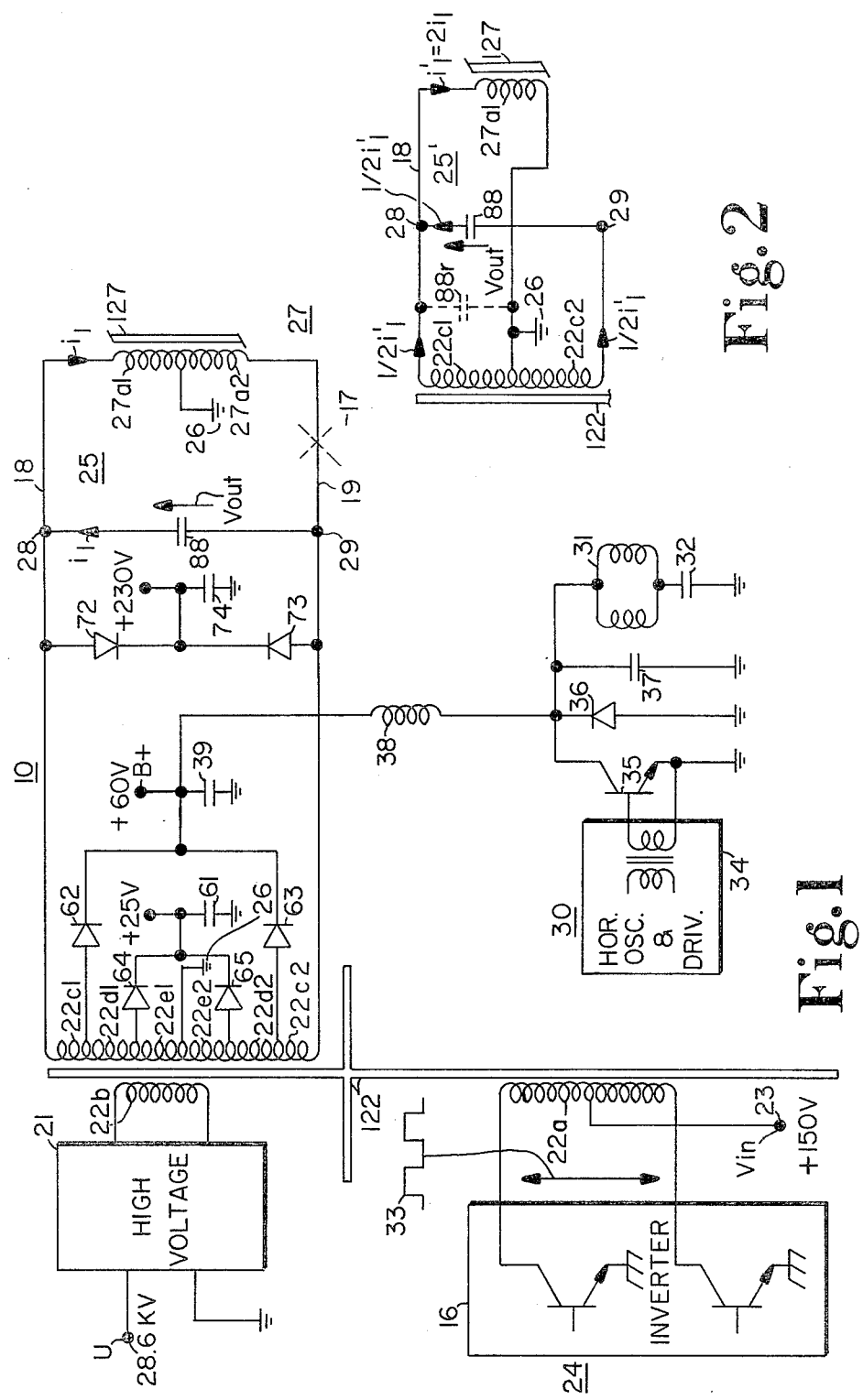

TELEVISION RECEIVER POWER SUPPLY FERRORESONANT LOAD CIRCUIT PROVIDED WITH A REDUNDANT OPERATING CAPABILITY

This invention relates to television receiver ferroresonant power supply circuits.

A ferroresonant power supply may be used to provide a regulated ultor voltage and a regulated B+ scanning voltage for a television receiver. When operated at a relatively high input frequency, such as the horizontal deflection frequency of about 16 KHz, a ferroresonant power supply is a relatively compact and low weight unit that provides inherent output voltage regulation without the need for a relatively complex and expensive electronic regulator control circuit.

In the U.S. patent applications of D. H. Willis, Ser. No. 220,847, filed Dec. 29, 1980, entitled "TELEVISION RECEIVER FERRORESONANT LOAD POWER SUPPLY", and Ser. No. 255,396, filed Apr. 20, 1981, entitled "TELEVISION RECEIVER FERRORESONANT LOAD POWER SUPPLY WITH REDUCED SATURABLE REACTOR CIRCULATING CURRENT", both herein incorporated by reference, a ferroresonant power supply is described wherein a source of unregulated alternating polarity voltage is coupled to the primary winding of a high leakage inductance power transformer. A ferroresonant saturable reactor load circuit is coupled across a secondary output winding of the high leakage transformer. A plurality of other secondary output windings, including a high voltage output winding, are magnetically tightly coupled to the first-mentioned secondary output winding.

Various television receiver direct voltages are derived from the alternating polarity voltages developed across the transformer secondary windings, including an ultor accelerating potential derived from the voltage developed across the high voltage winding and a B+ scanning voltage derived from the voltage developed across a low voltage winding. The ferroresonant load circuit regulates the voltage developed across one of the transformer secondary windings, thereby regulating the voltages developed across all the other tightly coupled secondary windings.

The self-regulating or ferroresonant load circuit comprises a saturable reactor and a capacitor coupled across the high leakage transformer secondary output winding. During each half cycle of the alternating polarity output voltage, the core of the saturable reactor magnetically saturates to develop a circulating current between the capacitor and a winding of the saturable reactor, thereby regulating, by ferroresonant operation, the alternating polarity output voltage.

In the second of the aforementioned Willis U.S. patent applications, an additional winding of the high leakage transformer, magnetically tightly coupled to the transformer primary winding, is conductively coupled in series with the ferroresonant saturable reactor winding across the ferroresonant load circuit capacitor and between two terminals of the transformer secondary output winding. Such an arrangement enables the ferroresonant load circuit to provide relatively good output voltage regulation at reduced circulating current levels.

A fault operating condition may arise wherein the saturable reactor winding becomes disconnected from the transformer secondary winding. In such a situation, the transformer secondary output voltages and the ultor accelerating potential undesirably tend to increase in amplitude. A feature of the invention is the incorporation of redundancy of ferroresonant operation to avoid excessive voltage increases should a portion of the ferroresonant load circuit become disconnected from the transformer secondary winding.

A transformer includes primary and secondary windings, with the primary winding being coupled to a source of input voltage for developing an alternating polarity supply voltage across the secondary winding. In response to the alternating polarity voltage developed across the secondary winding, a high voltage circuit develops an ultor accelerating potential for a picture tube of the television display system. A self-regulating load circuit includes a saturable reactor having a winding coupled to the transformer secondary winding for regulating the supply voltage. The transformer secondary winding and the saturable reactor winding each comprises two winding sections with each winding section having a terminal coupled to a common reference point so as to avoid an excessive increase in supply voltage should a portion of the self-regulating load circuit become disconnected from the transformer secondary winding.

FIG. 1 illustrates a television receiver deflection circuit and ferroresonant power supply incorporating a ferroresonant load circuit embodying the invention and provided with redundancy of operation;

FIG. 2 illustrates the electrical circuit of a portion of the ferroresonant power supply of FIG. 1 when one end of the ferroresonant load circuit saturable reactor winding becomes open circuited;

Figure 3:
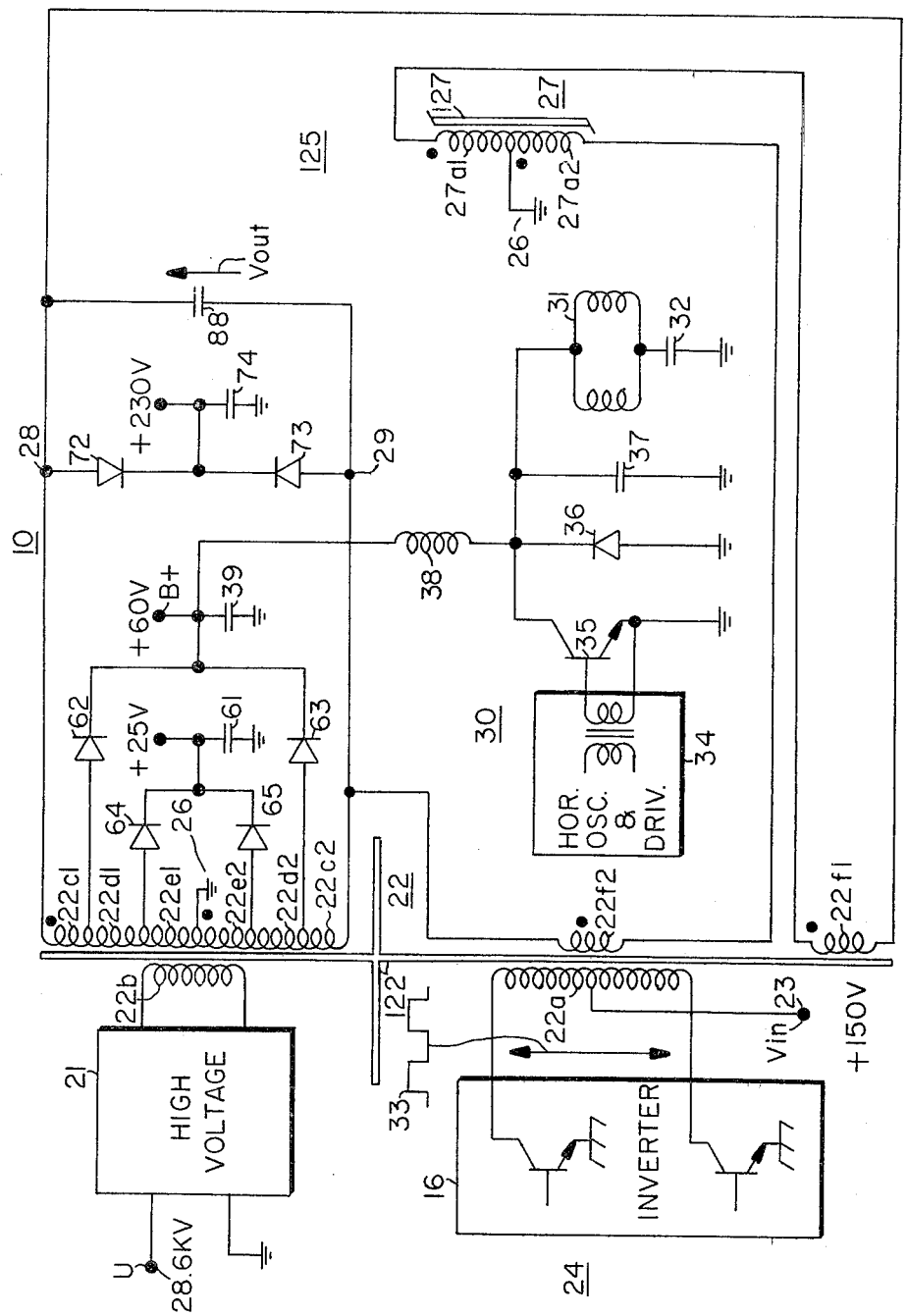
Figure 4:
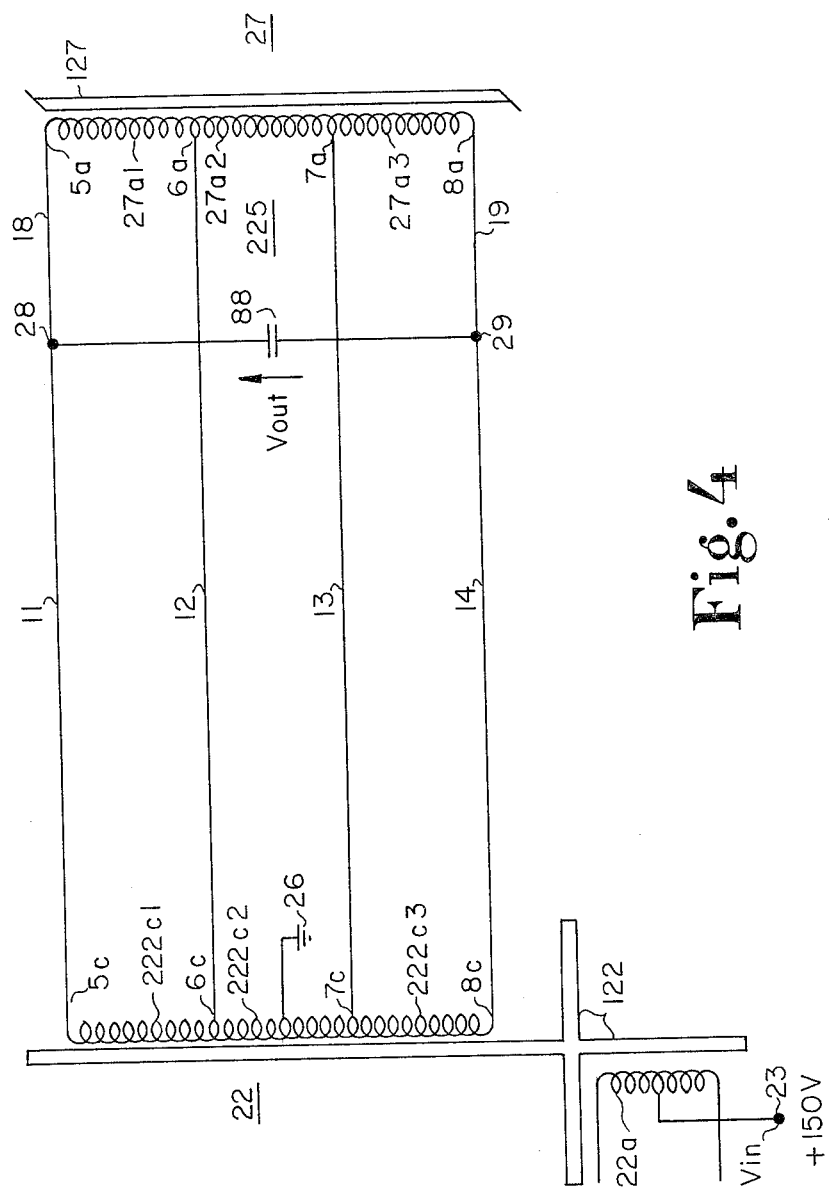

FIG. 3 illustrates another embodiment of a television receiver deflection and ferroresonant power supply incorporating a ferroresonant load circuit embodying the invention and provided with redundancy of operation; and FIG. 4 illustrates a portion of still another embodiment of a television receiver deflection and ferroresonant power supply incorporating a ferroresonant load circuit embodying the invention and provided with redundancy of operation.

In FIG. 1, a power supply 10 for a television receiver or television display system includes a source 24 of alternating input voltage 33 and a high leakage inductance power transformer 22. Alternating voltage source 24 comprises a source of unregulated direct voltage, Vin, developing illustratively +150 volts at an input terminal 23, and a high frequency inverter 16 coupled to the primary winding 22a of power transformer 22. Input terminal 23 is coupled to a center tap of primary winding 22a. Inverter 16 is operated at a relatively high frequency, such as the horizontal deflection frequency of illustratively 15.75 KHz, to develop across primary winding 22a the rectangular or square-wave voltage 33.

Square-wave voltage 33, when applied to primary winding 22a, develops an alternating polarity supply voltage across each of secondary output windings 22b–22e of transformer 22. Each one of secondary windings 22c–22e comprises two equal-turn winding sections 22c1–22c2, 22d1–22d2, 22e1–22e2, respectively. Each winding section has an end terminal coupled to a common reference point, such as chassis ground 26.

The alternating polarity output or supply voltage developed across winding 22c is full-wave rectified by diodes 72 and 73 and filtered by capacitor 74 to develop a direct supply voltage, of illustratively +230 volts, to power such circuits as the television receiver picture tube driver circuits. The alternating polarity output voltage developed across winding 22e is full-wave rectified by diodes 64 and 65 and filtered by a capacitor 61 to develop a direct supply voltage, of illustratively +25 volts, to power such television receiver circuits as the vertical deflection and audio circuits. The alternating polarity output voltage developed across winding 22d is full-wave rectified by diodes 62 and 63 and filtered by a capacitor 39 to develop at a B+ terminal, a B+ scan supply voltage to energize a horizontal deflection generator circuit 30.

Horizontal deflection circuit 30 comprises a horizontal oscillator and driver 34, a horizontal output transistor 35, a damper diode 36, a retrace capacitor 37, and an S-shaping or trace capacitor 32 coupled in series with a horizontal deflection winding 31 across horizontal output transistor 35. Horizontal deflection generator 30 is coupled to the B+ terminal through an inductor 38 and develops a horizontal scanning current in horizontal deflection winding 31.

The alternating polarity voltage developed across a high voltage winding, secondary winding 22b, is coupled to a high voltage circuit 21 to develop an ultor accelerating potential at a terminal U for a color television receiver. High voltage circuit 21 may include a high voltage rectifier arrangement such as a conventional voltage multiplier circuit of the Cockroft-Walton type, or may include a half-wave rectifier with its output coupled to the ultor terminal and having a plurality of diodes molded integrally with a plurality of winding sections, the winding sections of winding 22b not being individually illustrated in FIG. 1.

The output voltage Vout across secondary output winding 22c between terminals 28 and 29 is regulated by the ferroresonant operation of a ferroresonant or self-regulating load circuit 25. Ferroresonant load circuit 25 includes a capacitor 88 coupled between terminals 28 and 29 and a saturable reactor 27 having a saturable reactor winding 27a coupled across capacitor 88 and connected to terminals 28 and 29 by conductor lines 18 and 19, respectively. Saturable reactor 27a comprises two, equal-turn winding sections 27a1 and 27a2, with each winding section having an end terminal coupled to the common reference point, chassis ground.

By being coupled to transformer secondary output winding 22c, ferroresonant load circuit 25 acts as a regulating load circuit to maintain the voltage across winding 22c as the regulated voltage Vout. With the voltage across secondary output winding 22c regulated, the output voltages across all the other secondary windings that are tightly coupled to winding 22c, windings 22b, 22d and 22e, are also regulated. Because of the loose magnetic coupling between primary winding 22a and secondary windings 22b-22e, the voltages across these secondary windings can remain relatively unchanged in amplitude or half-cycle area, even though the voltage across the primary winding varies in amplitude.

Transformer 22, in combination with capacitor 88, develops an exciting current for saturable reactor winding 27a that generates a combined magnetic flux in the magnetizable core 127 that links winding 27a to produce the alternating polarity output voltage Vout. To regulate Vout by ferroresonant operation, capacitor 88 generates a circulating current during each half cycle of the alternating polarity output voltage that aids in magnetically saturating the core section of magnetizable core 127 that is associated with reactor winding 27a. In an alternate arrangement, capacitor 88 may be coupled across another winding, not illustrated in FIG. 1, of saturable reactor 27.

As the saturable core section of core 127 goes into saturation and comes out of saturation, the inductance exhibited by saturable reactor winding 27a switches between a low inductance state and a high inductance state. Under control of this switching action, which is a function of the saturation characteristics of the magnetizable material of core 127, the amplitude of the output voltage, the half-cycle area of the output voltage, or both the amplitude and half-cycle area are regulated against changes in the amplitude of the input voltage Vin and against changes in the loading on the various supply terminals including ultor supply terminal U.

A fault operating condition may arise wherein one end of saturable reactor winding 27a becomes disconnected from secondary output winding 22c, or becomes internally disconnected or open circuited at an intermediate winding terminal. Such a situation is illustrated in FIG. 1 by a break in the conductor line 19 connecting the bottom of saturable reactor winding 27a to terminal 29, with the break being schematically illustrated by the dashed-line X mark 17. Had saturable reactor winding 27a and transformer secondary winding 22c been designed as single winding units without a grounded center tap, the output voltage Vout would have tended to increase substantially with a break in conductor line 19. The voltage Vout would have increased because the high leakage transformer 22 would no longer have been loaded down by its connection to ferroresonant load circuit 25.

In accordance with the invention, transformer secondary winding 22c comprises two winding sections 22c1 and 22c2, and saturable reactor winding 27a comprises two winding sections 27a1 and 27a2. Appropriate end terminals of each of the four winding sections are coupled to a common reference point, chassis ground 26. Such an arrangement provides redundancy of ferroresonant operation should a portion of ferroresonant load circuit 25 become disconnected from transformer winding 22c. For example, if conductor line 19 opens, only one of the two saturable reactor winding sections, section 27a2, is operatively removed from its connection to transformer winding 22c. Saturable reactor winding 27a1 is still in-circuit to provide the necessary ferroresonant operation that provides substantial regulation of the output voltage Vout appearing across the entire winding 22c.

When saturable reactor winding 27a2 is disconnected, the remainder of the circuit is electrically connected as illustrated in FIG. 2. By transformer action, capacitor 88 is reflected across or effectively appears across saturable reactor winding section 27a1 as a reflected capacitance 88r, illustrated in FIG. 2 in dashed-line. The reflected capacitance value of capacitance 88r is 4 times the value of capacitor 88, and the voltage appearing across capacitance 88r is ½ the voltage Vout.

Capacitor 88, through its reflection as a capacitance 88r, still aids in the magnetic saturation of saturable reactor core 127 by producing a circulating current in the version 25' of the ferroresonant load circuit. This circulating current flows as a current $i_1'$ in saturable reactor winding section 27a1 which is double the amplitude to the current $i_1$ of FIG. 1. The circulating current in the version 25' of FIG. 2, unlike in the version 25 of FIG. 1, also flows in transformer secondary winding section 22c1.

By transformer action, a circulating current of ½ amplitude is produced in secondary winding section 22c2 and flows in capacitor 88 as a current ½ $i_1'$, in the direction illustrated in FIG. 2. Thus, under the aforementioned fault condition, regulation of the output voltage Vout is still maintained but at twice the circulating current amplitude of FIG. 1 flowing in saturable reactor winding 27a1.

Similar redundant operation occurs should other types of disconnection occur with respect to ferroresonant load circuit 25. For example, if the conductor wire between terminal 29 and the bottom terminal of transformer secondary winding section 22c2 breaks, a circulating current is still generated and flows between capacitor 88 and the full saturable reactor winding 27a. Exciting current for saturable reactor 27 is now provided by capacitor 88 and transformer secondary winding section 22c1 alone.

The voltage across transformer secondary winding section 22c1 is regulated by the redundant ferroresonant load circuit at a value equal that of ½ the voltage Vout, the same voltage that is developed across saturable reactor winding 27a1. It should be noted that transformer secondary winding section 22c1 sees a reflected capacitance of 4 times the value of capacitor 88. The reflection of capacitor 88 is accomplished by the transformer action of saturable reaction winding 27a, which produces a reflection of capacitor 88 across the individual winding section 27a1.

FIG. 3 illustrates the deflection circuit and ferroresonant power supply 10 of FIG. 1 with a different, redundantly connected, ferroresonant load circuit 125 embodying the invention. Elements of the two figures commonly identified function in a similar manner. In FIG. 3, transformer 22 includes an additional winding 22f comprising two winding sections 22f1 and 22f2. Winding sections 22f1 and 22f2, and thus, the full winding 22f, are magnetically tightly coupled to transformer primary winding 22a. Winding sections 22f1 and 22f2, and thus, the full winding 22f, are conductively coupled in a series arrangement with saturable reactor winding sections 27a1 and 27a2, and thus, are conductively coupled in a series arrangement with the full saturable reactor winding 27a, across capacitor 88.

With the winding polarities of transformer 22 and saturable reactor 27 as illustrated in FIG. 3, the regulated output voltage Vout equals the difference between the voltage developed across the full saturable reactor winding 27a, the voltage being referenced to the bottom terminal of winding section 27a2, and the sum of the voltages developed across transformer winding sections 22f1 and 22f2, the voltage across each transformer winding section being referenced to its respective undotted terminal. Such an arrangement, as described in the second of the aforementioned U.S. patent applications of D. H. Willis, provides for relatively good regulation of the voltage Vout at a relatively low circulating current level in ferroresonant load circuit 125. Because of the subtractive relationship aforementioned, an increase in the voltage across the full saturable reactor winding 27a due, for example, to an increase in the unregulated voltage Vin, is offset by an increase in the voltages across each of the transformer winding sections 22f1 and 22f2, thereby maintaining the voltage Vout substantially unchanged in amplitude, half-cycle area, or both.

With the redundant arrangement of saturable reactor winding sections 27a1 an 27a2 and of transformer winding sections 22c1, 22c2, 22f1 and 22f2, a fault operating condition similar to one of those previously described does not disrupt ferroresonant operation of the load circuit 125. Substantial regulation of the output voltage Vout is maintained.

FIG. 4 illustrates a portion of the ferroresonant power supply 10 of FIG. 1 having a different redundantly connected ferroresonant load circuit 225 embodying the invention. Elements of the two figures commonly identified function in a similar manner. In FIG. 4, saturable reactor winding 27a comprises three winding sections 27a1, 27a2 and 27a3. Each of the winding sections may illustratively have the same number of conductor turns. A secondary winding 222c of high leakage transformer 22 is coupled between terminals 28 and 29.

Transformer secondary winding 222c also comprises three winding sections 222c1, 222c2 and 222c3. Each end terminal, 5c–8c, of each winding section of transformer winding 222c is coupled to a corresponding end terminal 5a–8a of a corresponding section of saturable reactor winding 27a by way of the appropriate ones of conductor lines 11–14, 18 and 19. Such an arrangement provides redundancy of operation of ferroresonant load circuit 225. Should, for example, conductor line 19 open, ferroresonant operation is still maintained because of the reflection of capacitor 88 between end terminals 5c and 7c of transformer 22.

I claim:

1. A self-regulating power supply for a television display system, comprising:
    a source of input voltage;
    a transformer including primary and secondary windings, said primary winding being coupled to said source for developing an alternating polarity supply voltage across said secondary winding;
    means including a high voltage rectifier arrangement responsive to the alternating polarity voltage developed across said secondary winding for developing an ultor accelerating potential for a picture tube of said television display system; and
    a self-regulating load circuit including a saturable reactor having a winding coupled to said transformer secondary winding for regulating said supply voltage,
    said transformer secondary winding and said saturable reactor winding each comprising two winding sections, each winding section having a terminal coupled to a common reference point so as to avoid an excessive increase in said supply voltage when a portion of said self-regulating load circuit becomes disconnected from said transformer secondary winding.

2. A power supply according to claim 1 wherein said transformer includes a third winding and wherein said self-regulating load circuit includes a capacitance coupled between two terminals of said transformer secondary winding and coupled across the series arrangement of said saturable reactor winding and transformer third winding.

3. A power supply according to claim 2 wherein said transformer third winding comprises two winding sections, each one being coupled to a corresponding winding section of said saturable reactor winding and to a corresponding winding section of said transformer secondary winding.

4. A power supply according to claim 1 wherein said transformer secondary and transformer third windings are magnetically tightly coupled to each other.

5. A power supply according to claims 1 or 4 wherein said transformer primary and secondary windings are magnetically loosely coupled to each other.

6. A power supply according to claim 1 wherein said self-regulating load circuit includes a capacitance coupled to said transformer secondary winding, said capacitance producing a circulating current in said saturable reactor winding when at least a portion of the saturable reactor magnetizable core substantially magnetically saturates.

7. A power supply according to claim 6 wherein said saturable reactor winding is coupled to said transformer secondary winding such that a circulating current is produced by said capacitance and flows in a winding section of said saturable reactor winding and in said transformer secondary winding when the other winding section of said saturable reactor becomes disconnected.

8. In a television display system, a self-regulating power supply for energizing a load circuit therein, comprising:

a transformer;

a self-regulating saturable reactor arrangement including a saturable reactor winding located on a magnetizable core and coupled to a winding of said transformer for developing an alternating polarity output voltage and a capacitance for developing a circulating current that aids in magnetically saturating a portion of said core to provide regulation of said output voltage;

a load circuit within said television display system; and means coupled to said load circuit and responsive to the regulated output voltage for energizing said load circuit, said transformer winding and said saturable reactor winding each comprising at least two winding sections, with each end terminal of each section of said transformer winding being coupled to a corresponding end terminal of a corresponding reaction of said saturable reactor winding to provide redundancy of operation of said self-regulating saturable reactor arrangement.

9. A power supply according to claim 8 wherein an end terminal of each section of said transformer and saturable reactor windings is coupled to a common reference terminal.

10. A power supply according to claim 8 including a source of input voltage coupled to another winding of said transformer, said self-regulating saturable reactor arrangement functioning as a regulating load circuit that loads the first mentioned transformer winding.

11. A power supply according to claim 10 wherein the first mentioned load circuit comprises the ultor circuit of the television display system picture tube and wherein said energizing means comprises a high voltage rectifier arrangement having an output terminal coupled to the ultor terminal of said ultor circuit.

12. A power supply according to claim 11 including a high voltage winding coupled to said high voltage rectifier arrangement and magnetically coupled to the first mentioned transformer winding.

* * * * *

UNITED STATES PATENT AND TRADEMARK OFFICE
CERTIFICATE OF CORRECTION

PATENT NO. : 4,429,260

DATED : January 31, 1984

INVENTOR(S) : Walter Truskalo

It is certified that error appears in the above-identified patent and that said Letters Patent is hereby corrected as shown below:

```
Column 1, line 21, after "1981," and before "entitled" insert
--now U.S. Patent 4,353,014--.  Column 6, line 2, the portion
reading "an" should read "and".  Column 7, line 1, the
portion reading "Claim 1" should read "Claim 3".  Column 8,
line 10, the portion reading "reaction" should read
"section".
```

Signed and Sealed this

Twenty-seventh Day of November 1984

[SEAL]

Attest:

GERALD J. MOSSINGHOFF

*Attesting Officer*     *Commissioner of Patents and Trademarks*